(12) United States Patent
Jeon et al.

(10) Patent No.: US 8,983,743 B2
(45) Date of Patent: Mar. 17, 2015

(54) VARIABLE CONTROL APPARATUS AND METHOD FOR DETERMINING SHORT-TERM DRIVING TENDENCY

(71) Applicants: Hyundai Motor Company, Seoul (KR); Kia Motors Corporation, Seoul (KR)

(72) Inventors: Byeong Wook Jeon, Seoul (KR); Dong Hoon Jeong, Osan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/143,769

(22) Filed: Dec. 30, 2013

(65) Prior Publication Data
US 2014/0365088 A1 Dec. 11, 2014

(30) Foreign Application Priority Data

Jun. 7, 2013 (KR) .......................... 10-2013-0065501

(51) Int. Cl.
*G06F 7/00* (2006.01)
*G07C 5/00* (2006.01)

(52) U.S. Cl.
CPC ........................................ *G07C 5/00* (2013.01)
USPC .................................. 701/57; 701/59; 701/65

(58) Field of Classification Search
CPC ................ F16H 2061/0081; F16H 2061/0087; F16H 2061/009; F16H 2061/0093; B60W 30/08; B60W 30/09; B60W 30/16; B60W 30/182; B60W 40/09; B60W 40/107; B60W 2050/0029; B60W 2540/30; B60W 2550/142; B60W 2550/143; B60W 2550/146
See application file for complete search history.

(56) References Cited

U.S. PATENT DOCUMENTS

| 8,521,338 | B2* | 8/2013 | Takeuchi et al. ................... 701/1 |
| 2008/0167820 | A1* | 7/2008 | Oguchi et al. ................ 701/301 |
| 2011/0118929 | A1* | 5/2011 | Takae et al. ...................... 701/29 |
| 2011/0172864 | A1* | 7/2011 | Syed et al. ....................... 701/22 |
| 2012/0136506 | A1 | 5/2012 | Takeuchi et al. |
| 2012/0245758 | A1* | 9/2012 | Mizuta et al. ...................... 701/1 |
| 2014/0277972 | A1* | 9/2014 | Jeon et al. ........................ 701/51 |
| 2014/0297140 | A1* | 10/2014 | Jeon et al. ........................ 701/55 |

FOREIGN PATENT DOCUMENTS

| KR | 1997-0009794 | B1 | 6/1997 |
| KR | 2002-0089920 | A | 11/2002 |
| KR | 10-0391724 | B1 | 7/2003 |
| KR | 10-0820436 | B1 | 4/2008 |
| KR | 1020120022305 | A | 3/2012 |
| KR | 1020120060067 | A | 6/2012 |

* cited by examiner

*Primary Examiner* — David D Le
(74) *Attorney, Agent, or Firm* — Morgan, Lewis & Bockius LLP

(57) ABSTRACT

A variable control apparatus and method determines a short-term driving tendency. The apparatus may include a driving information collecting unit configured to collect driving information for determining a driving tendency, a first short-term driving tendency calculating module configured to calculate a first short-term driving tendency index using a fuzzy control theory based on an inputted opening degree of an accelerator pedal position sensor (APS), a second short-term driving tendency calculating module configured to calculate a second short-term driving tendency index using the fuzzy control theory based on an inputted forward vehicle relative speed, and a control module configured to calculate a final short-term driving tendency index by differentially applying weight values of the first short-term driving tendency index and the second short-term driving tendency index for each vehicle speed.

13 Claims, 4 Drawing Sheets

VARIABLE CONTROL APPARATUS AND METHOD FOR DETERMINING SHORT-TERM DRIVING TENDENCY

CROSS-REFERENCE TO RELATED APPLICATION

The present application claims priority of Korean Patent Application Number 10-2013-0065501 filed on Jun. 7, 2013, the entire contents of which application are incorporated herein for all purposes by this reference.

BACKGROUND OF INVENTION

1. Field of Invention

The present invention relates to a variable control apparatus and a variable control method for determining a short-term driving tendency, and more particularly, to a variable control apparatus and a variable control method for determining a short-term driving tendency in accordance with a relative speed with respect to a forward vehicle and an acceleration operation.

2. Description of Related Art

In general, drivers, who drive vehicles, have different and various driving tendencies, respectively. For example, like a driver who drives a vehicle at a high average running speed, a driver using low or high acceleration and deceleration characteristics compared to other drivers, a driver who performs fuel-efficient driving, or a driver who drives a vehicle over a long distance on a highway mainly on weekends, drivers may have many different driving tendencies.

A satisfaction of the customer regarding running performance of a vehicle depends on how the vehicle runs and coincides with a driving tendency of the driver. But because the premade vehicles generally have predetermined uniform performance characteristics, there is a drawback in that various driving tendencies of the customers are not reflected. Therefore, in recent years, researches on vehicle control technologies based on a driving tendency of the driver, which recognizes the driving tendency of the driver and allows the vehicle to respond suitably to the driving tendency of the driver, are being actively conducted.

In order to provide the vehicle control technology based on the driving tendency of the driver, first, it is very important to accurately determine the driving tendency of the driver. Meanwhile, in order to determine an acceleration driving tendency of the driver, an accelerator pedal opening degree (APS) and a change rate of an accelerator pedal opening degree ($\Delta$APS) were mainly used in the related art. However, even though a situation of manipulating the accelerator pedal is an important reference for determining the driver's acceleration intention, there is a limitation to express the overall driving intention of the driver. In addition, since an inaccurate tendency determination numerical value is obtained regardless of the tendency of the driver when continuously calculating the tendency of the driver in the aforementioned problematic situation, there is a problem in that reliability on the vehicle control technology based on the overall driving tendency deteriorates.

Therefore, in order to provide the vehicle control technology based on the driving tendency, which shows high reliability and satisfaction of the customers, a method capable of more accurately determining the driving tendency of the driver is required.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a variable control apparatus and a variable control method for determining a short-term driving tendency which differentially apply weight values with respect to an accelerator pedal operation and a relative speed to a forward vehicle on the basis of a vehicle speed.

Various aspects of the present invention provide a variable control apparatus for determining a short-term driving tendency of a driver according to driving a vehicle that may include: a driving information collecting unit configured to collect driving information for determining a driving tendency; a first short-term driving tendency calculating module configured to calculate a first short-term driving tendency index using a fuzzy control theory based on an opening degree of an accelerator pedal position sensor (APS); a second short-term driving tendency calculating module configured to calculate a second short-term driving tendency index using the fuzzy control theory based on a forward vehicle relative speed; and a control module configured to calculate a final short-term driving tendency index by differentially applying weight values of the first short-term driving tendency index and the second short-term driving tendency index for each vehicle speed.

In addition, the control module may store a sporty index weight value function for obtaining each of the weight values of the first short-term driving tendency index and the second short-term driving tendency index for each vehicle speed. The control module may increase a proportion of the weight value of the first short-term driving tendency index compared to the second short-term driving tendency index when the vehicle speed is equal to or less than a first reference speed. The control module may increase a proportion of the weight value of the second short-term driving tendency index compared to the first short-term driving tendency index when the vehicle speed is equal to or greater than a second reference speed.

The final short-term driving tendency index may be calculated by an equation of $SI_{TOTAL} = SI_1 \times W_1 + SI_2 \times W_2$. Here, $SI_1$ denotes a first short-term driving tendency index, $W_1$ denotes a first weight value, $SI_2$ denotes a second short-term driving tendency index, and $W_2$ denotes a second weight value.

The driving information collecting unit may collect at least one of a vehicle speed according to driving the vehicle by the driver, vehicle acceleration, an inter-vehicle distance, the APS opening degree, a position of a brake pedal, a position of gear shifting, a steering state of the vehicle, position information based on a GPS/GIS, road information, a degree of congestion of a driving section, and weather information. In addition, the driving information collecting unit may calculate a difference in speed between a forward vehicle and the vehicle of a driver using a distance from the forward vehicle, which is detected by an inter-vehicle distance sensor.

The first short-term driving tendency calculating module may set a membership function on the basis of the APS opening degree, and calculate the first short-term driving tendency index from the inputted membership function of the APS opening degree. The second short-term driving tendency calculating module may set a membership function on the basis of the forward vehicle relative speed, and calculate the second short-term driving tendency index from the inputted membership function of the forward vehicle relative speed.

Various other aspects of the present invention provide a variable control method for determining a short-term driving tendency of a driver according to driving a vehicle that may include: collecting driving information for determining a short-term driving tendency according to driving the vehicle; calculating a first short-term driving tendency index by calculating a first fuzzy result value from a first membership function based on an accelerator pedal position sensor (APS) opening degree; calculating a second short-term driving tendency index by calculating a second fuzzy result value from a second membership function based on a forward vehicle relative speed; and calculating a final short-term driving tendency index by differentially applying weight values of the first short-term driving tendency index and the second short-term driving tendency index according to a vehicle speed.

The calculating of the final short-term driving tendency index may include increasing a proportion of the weight value of the first short-term driving tendency index compared to the second short-term driving tendency index when the vehicle speed is equal to or less than first reference speed. The calculating of the final short-term driving tendency index may include increasing a proportion of the weight value of the second short-term driving tendency index compared to the first short-term driving tendency index when the vehicle speed is equal to or greater than a second reference speed.

In addition, the collecting of the driving information may include initiating calculation of the short-term driving tendency when an accumulated running time or running distance reaches a predetermined condition for initiating the calculation of the short-term driving tendency index after the vehicle is started.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
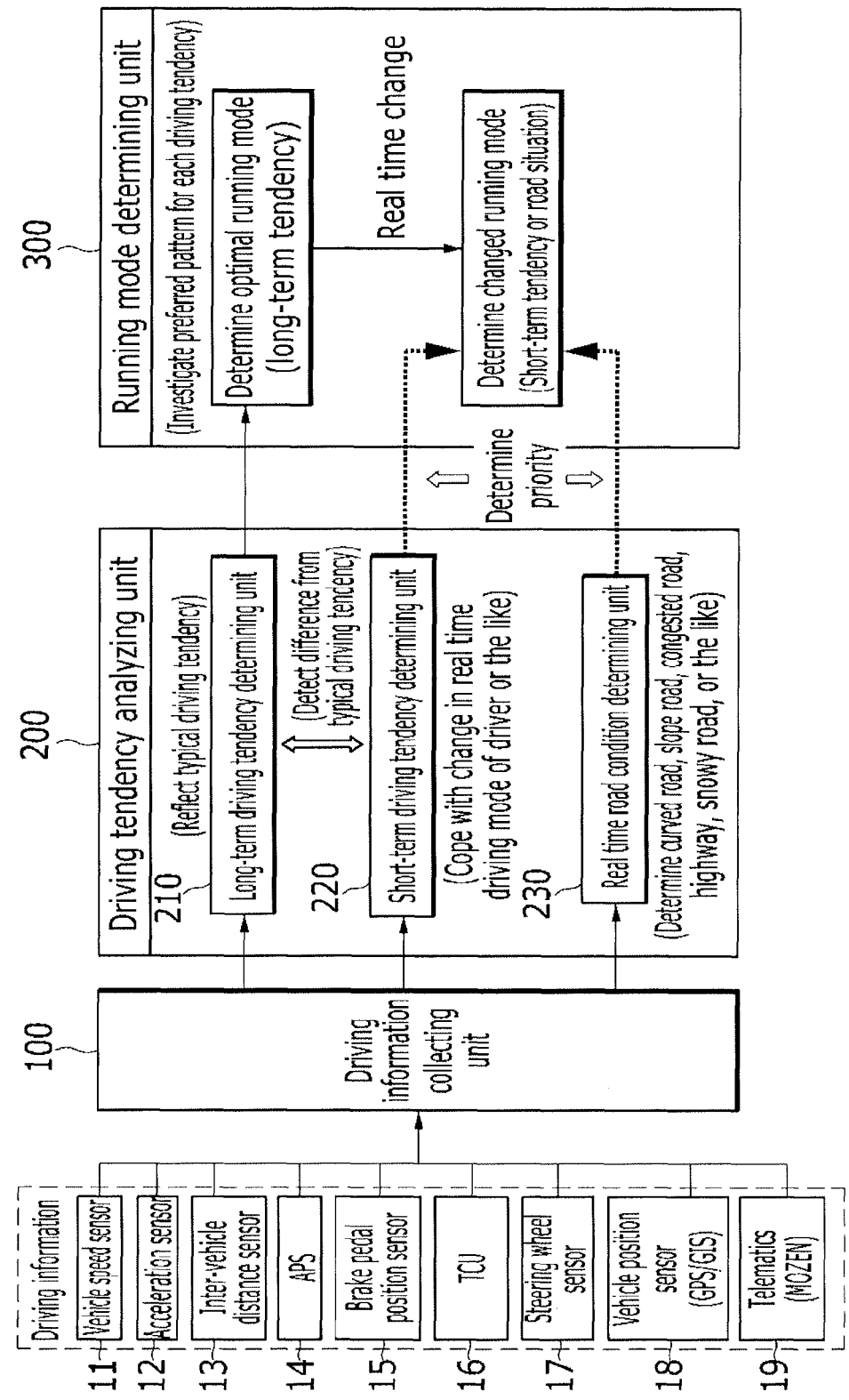
FIG. 1 is a block diagram schematically illustrating an exemplary vehicle control system based on a driving tendency according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims. Accordingly, the drawings and description are to be regarded as illustrative in nature and not restrictive. Like reference numerals designate like elements throughout the specification.

FIG. 1 is a block diagram schematically illustrating a vehicle control system based on a driving tendency according to various embodiments of the present invention. Referring to the accompanying FIG. 1, a vehicle control system based on a driving tendency according to an exemplary embodiment of the present invention includes a driving information collecting unit 100, a driving tendency analyzing unit 200, and a running mode determining unit 300.

The driving information collecting unit 100 detects vehicle driving information that is a basis for determining a driving tendency of a driver, and to this end, the driving information collecting unit 100 is connected to various sensors, controllers, and devices through an internal or external network of a vehicle.

The driving information collecting unit 100 may collect or detect driving information in conjunction with at least one of a vehicle speed sensor 11, an acceleration sensor 12, an inter-vehicle distance sensor 13, an accelerator pedal position sensor 14, a brake pedal position sensor 15, a TCU 16, a steering wheel sensor 17, a vehicle position sensor (GPS/GIS) 18, and a telematics 19.

The driving information collecting unit 100 collects or detects vehicle speed using the vehicle speed sensor 11, collects or detects acceleration of the vehicle using the acceleration sensor 12, and collects or detects inter-vehicle distances with a forward vehicle using the inter-vehicle distance sensor 13. Here, the inter-vehicle distance sensor 13 may sense a relative distance between the forward vehicle and the present vehicle by utilizing forward radar signals, and additionally, at least one of an infrared sensor and an ultrasonic wave sensor may be used as the inter-vehicle distance sensor 13.

The driving information collecting unit 100 collects or detects how much an accelerator pedal is pressed (hereinafter, referred to as an opening degree of the accelerator pedal) using the accelerator pedal position sensor (APS) 14, and collects or detects how much a brake pedal is pressed using the brake pedal position sensor 15. Here, it is possible to detect acceleration and deceleration tendencies of the driver using an operational pattern of the APS 14 and the brake pedal position sensor 15.

The driving information collecting unit 100 collects or detects gear shifting positions using the TCU (transmission control unit) 16, and collects or detects steering states of the vehicle using the steering wheel sensor 17.

The driving information collecting unit 100 may collect or detect vehicle position information based on the GPS/GIS and information on a road type, a degree of curve, and a degree of slope, using the vehicle position sensor 18, and collect or detect a degree of congestion and weather information (for example, a snowy road, a rainy road, or a foggy road) of a driving section using the telematics 19.

Here, the telematics 19 refers to a terminal in which functions of a mobile telematics system (MTS) terminal, which is called a MOZEN, a car ubiquitous system (CUbiS) terminal, which is called an auto care, a blue link (emergency situation service), and a navigation terminal are integrated, and supports wireless network communication (for example, 3G or 4G) of the vehicle.

The driving tendency analyzing unit 200 determines the driving tendency of the driver by analyzing the vehicle driving information of the driver, which is collected by the driving information collecting unit 100, and includes a long-term driving tendency determining unit 210, a short-term driving tendency determining unit 220, and a real time road condition determining unit 230.

The long-term driving tendency determining unit 210 accumulates the vehicle driving information of the driver for a predetermined long period or by a predetermined number of driving times, calculates a long-term driving tendency index with a probability value based on normal distribution by comparing and analyzing an average value of the accumulated driving information, and reflects the long-term driving tendency index to a typical driving tendency.

Meanwhile, the tendency of the driver is not always uniform, and may be changed in accordance with changes of the mood of the driver, sudden changes in driving intention, a road condition, or the like.

The short-term driving tendency determining unit 220 according to various embodiments of the present invention calculates a short-term driving tendency index for determining a short-term driving intention of the driver as an objective numeric value using a fuzzy control theory. Here, the short-term driving tendency, compared to the long-term driving tendency, is a reference for determining the driver's sudden intention to accelerate and decelerate the vehicle. That is, a real time driving tendency of the driver is objectified by quantitatively digitizing a driving operation form (i.e. vehicle driving information) that is shown by a comparatively short time unit in comparison with the long-term driving tendency. The short-term driving tendency may be utilized as a reference value for automatically converting control factors, which are involved in the feel of acceleration, fuel consumption, the feel of gear shifting, and the like, for an optimal driving condition.

The real time road condition determining unit 230 analyzes a curved road, a slope road, a congested road, a highway, a snowy road, or the like according to the road or weather information, which affect the vehicle driving, and the vehicle position information based on the GPS/GIS. Here, the analyzed real time road condition may be reflected to determine a running mode according to a tendency of a customer.

The running mode determining unit 300 investigates a preferred pattern for each driving tendency of the driver, and determines an optimal running mode by reflecting a typical long-term driving tendency. For example, the running mode determining unit 300 may determine an eco-drive mode or a sports mode based on a personal driving tendency index of the driver.

In addition, the running mode determining unit 300 reflects the short-term driving tendency to the optimal running mode based on the long-term driving tendency of the driver, thereby determining a changed running mode according to change of the mood of the driver or sudden changes in driving intention.

In addition, the running mode determining unit 300 may determine a changed running mode according to a road situation by further considering a real time road situation in addition to the optimal running mode, and for example, may determine various running modes such as a downtown mode considering the vehicle driving section and a mode for each commuting section.

Meanwhile, a process of determining the driving tendency of the driver and differentiating the feel of gear shifting, a shift pattern, an engine torque map, an engine filter, and the like is a very important factor in terms of customization of running performance, and the aforementioned short-term driving tendency determining unit 220 is suggested as a basic constituent element to determine the driving tendency, as described above.

However, as pointed out in the description of the related art, there are problems in that when an acceleration driving tendency of the driver is determined, an inaccurate result is caused because a relative speed to the forward vehicle does not match an acceleration situation on a congested road where a vehicle speed is low, and the inaccurate result is caused because distinction between operational amounts of the accelerator pedal is not large on a highway where a vehicle speed is high. Therefore, the short-term driving tendency determining unit 220, which includes a variable control function of determining the short-term driving tendency of the driver according to various embodiments of the present invention, is provided with reference to FIG. 2, and a configuration thereof will be described.

Figure 2:
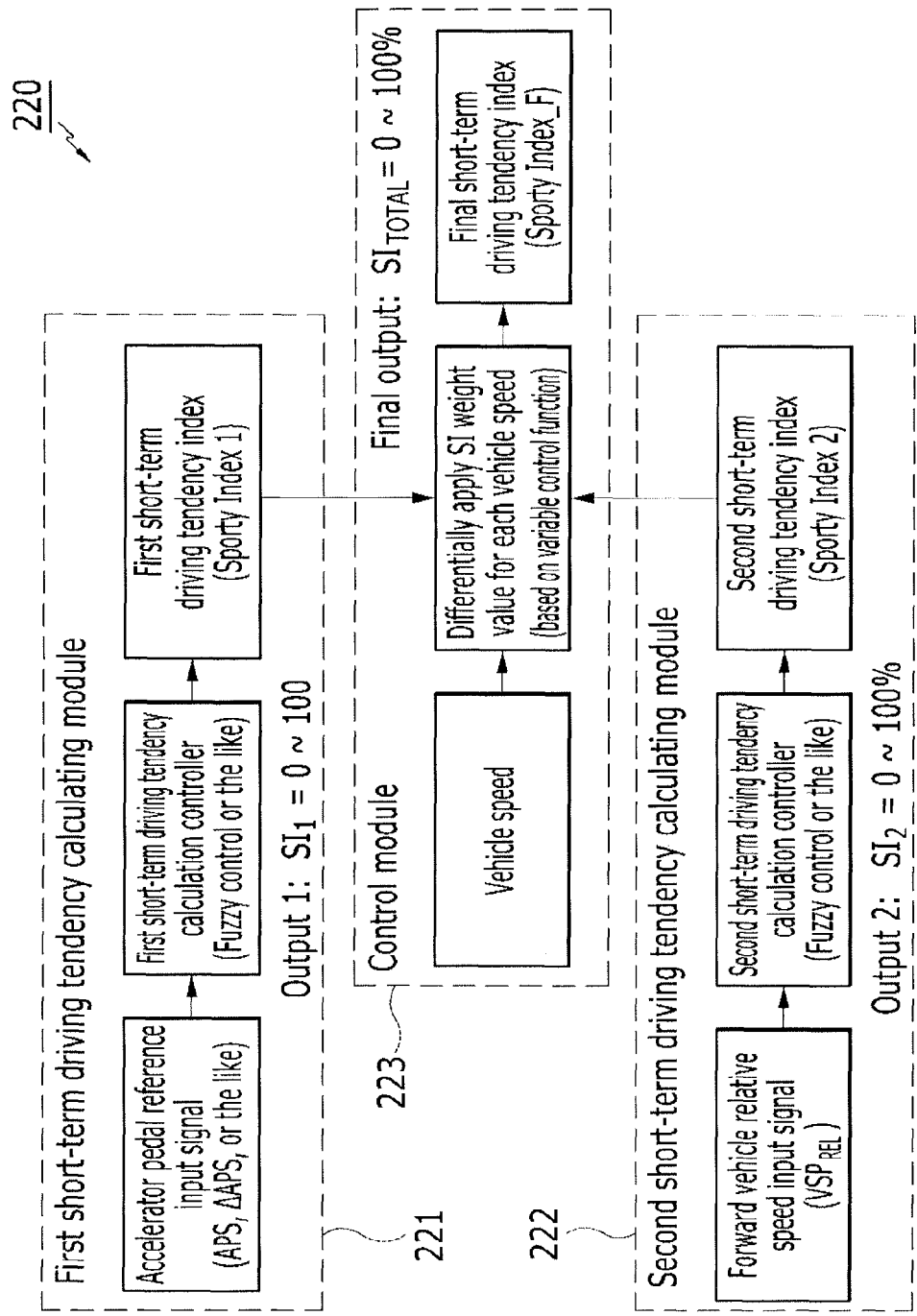
FIG. 2 is a block diagram illustrating an exemplary short-term driving tendency determining unit including a variable control function of determining a short-term driving tendency according to the present invention.

FIG. 2 is a block diagram illustrating a configuration of the short-term driving tendency determining unit including a variable control function of determining a short-term driving tendency according to various embodiments of the present invention. Referring to the accompanying FIG. 2, the short-term driving tendency determining unit 220 includes a first short-term driving tendency calculating module 221, a second short-term driving tendency calculating module 222, and a control module 223.

The first short-term driving tendency calculating module 221 receives an accelerator pedal reference input signal (for example, APS opening degree) for determining a first short-term driving tendency from the driving information collecting unit 100. Further, a first short-term driving tendency index (sporty index 1, $SI_1$) for determining a short-term driving intention of the driver as an objective numeric value is calculated using the fuzzy control theory based on the inputted APS opening degree.

For example, the first short-term driving tendency calculating module 221 applies the fuzzy control theory to the APS opening degree, and sets a membership function on the basis of the APS opening degree. Further, the first short-term driving tendency calculating module 221 calculates the first short-term driving tendency index ($SI_1$=0 to 100%), which is a fuzzy result value, from the inputted membership function of the APS opening degree. Here, a fuzzy rule for determining the first short-term driving tendency may be defined as in the following exemplary embodiment.

Based on the membership function of the APS opening degree of the driver, the first short-term driving tendency calculating module 221 may determine that the driver has a mild driving tendency as the vehicle speed of the driver becomes lower and the APS opening degree becomes smaller. In addition, the first short-term driving tendency calculating module 221 may determine that the driver has a sporty driving tendency as the vehicle speed becomes higher and the APS opening degree becomes larger. That is, it may be determined that the driver having a gentle acceleration habit and a defensive driving pattern has the mild driving tendency, and the driver having a rapid acceleration habit and an aggressive driving pattern has the sporty driving tendency.

Meanwhile, the second short-term driving tendency calculating module 222 receives a forward vehicle relative speed input signal ($VSP_{REL}$) for determining a second short-term driving tendency from the driving information collecting unit 100. Here, a forward vehicle relative speed may be obtained by the driving information collecting unit 100 by calculating a difference in speed between the forward vehicle and the vehicle of the driver using a distance between the vehicle of the driver and the forward vehicle, which is detected by the inter-vehicle distance sensor 13.

Further, a second short-term driving tendency index (sporty index 2, $SI_2$) for determining a second short-term driving intention of the driver as an objective numeric value is calculated using the fuzzy control theory based on the inputted forward vehicle relative speed. For example, the second short-term driving tendency calculating module 222 applies the fuzzy control theory to the vehicle speed and the forward vehicle relative speed, and sets a membership function on the basis of the forward vehicle relative speed of the vehicle.

Further, the second short-term driving tendency calculating module 222 calculates the second short-term driving tendency index (e.g., $SI_2$=0 to 100%), which is a fuzzy result value, from the inputted membership function of the forward vehicle relative speed. Here, a fuzzy rule for determining the second short-term driving tendency may be defined as in the following exemplary embodiment.

Based on the membership function of the vehicle speed of the driver and the forward vehicle relative speed, the second short-term driving tendency calculating module 222 may determine that the driver has a mild driving tendency as the vehicle speed of the driver becomes lower and the forward vehicle relative speed becomes lower. In addition, the second short-term driving tendency calculating module 222 may determine that the driver has a sporty driving tendency as the vehicle speed becomes higher and the forward vehicle relative speed becomes higher. That is, it may be determined that the driver having a gentle acceleration habit and a defensive driving pattern has the mild driving tendency, and the driver having a rapid acceleration habit and an aggressive driving pattern has the sporty driving tendency.

The control module 223 obtains a weight value of the first short-term driving tendency index $SI_1$ based on the APS opening degree for each vehicle speed of the vehicle that is being driven, and a weight value of the second short-term driving tendency index $SI_2$ based on the forward vehicle relative speed, and calculates a final short-term driving tendency index (e.g., $SI_{TOTAL}$=0 to 100%) by differentially applying the weight values according to the current vehicle speed.

To this end, the control module 223 stores a sporty index weight value function for obtaining a weight value of the first short-term driving tendency index $SI_1$ based on the APS opening degree for each vehicle speed, and a weight value of the second short-term driving tendency index $SI_2$ based on the forward vehicle relative speed, respectively.

Figure 3:
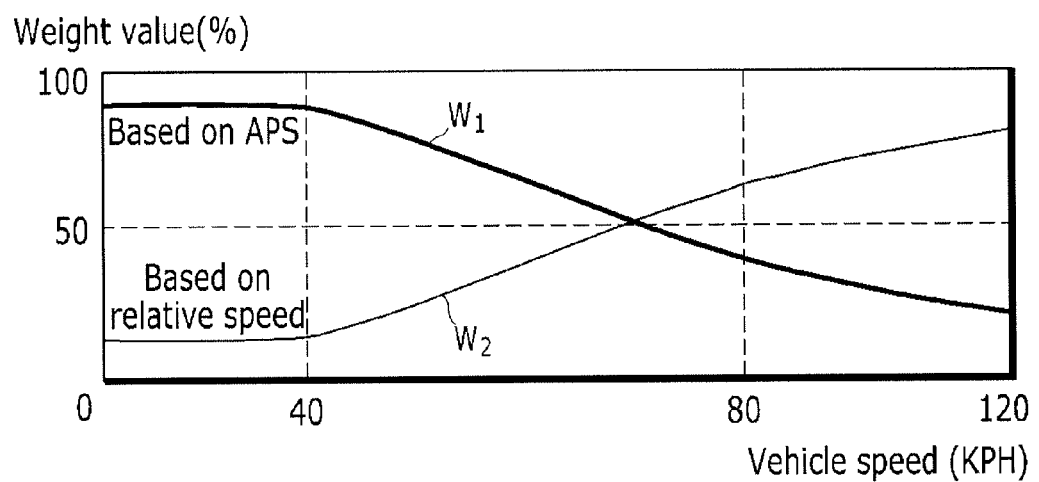
FIG. 3 is a graph illustrating an exemplary sporty index weight value function according to the present invention.

FIG. 3 is a graph illustrating the sporty index weight value function according to various embodiments of the present invention. Referring to the accompanying FIG. 3, the sporty index weight value function shows a proportion of each of the weight values $W_1$ and $W_2$ of the first short-term driving tendency index $SI_1$ based on the APS opening degree that is varied for each vehicle speed (KPH) and the second short-term driving tendency index $SI_2$ based on the forward vehicle relative speed.

The control module 223 applies the weight values according to whether to increase the first short-term driving tendency index $SI_1$ based on the APS opening degree or the second short-term driving tendency index $SI_2$ based on the forward vehicle relative speed with reference to the sporty index weight value function in accordance with the vehicle speed of the vehicle that is being driven.

Here, since reliability on an operation of the APS by the driver is high when the vehicle speed is low, and reliability on a forward vehicle following situation (i.e., relative speed) of the driver is high when the vehicle speed is high, the control module 223 may obtain the following result.

First, in a case in which the vehicle speed is low (for example, 40 KPH or lower), a first weight value $W_1$ may be determined as 90%, and a second weight value $W_2$ may be determined as 10%. Second, in a case in which the vehicle speed is high (for example, 80 KPH or higher), the first weight value $W_1$ may be determined as 40%, and the second weight value $W_2$ may be determined as 60%. One would appreciate that the reference values given herein (e.g., 10%, 40%, 60%, 90%, and 40 KPH, 80 KPH) are exemplary and are readily adjustable.

Further, the control module 223 may calculate the final short-term driving tendency index $SI_{TOTAL}$ on the basis of the first weight value $W_1$ of the first short-term driving tendency index $SI_1$ and the second weight value $W_2$ of the second short-term driving tendency index $SI_2$ using the following Equation 1.

$$SI_{TOTAL}=SI_1 \times W_1 + SI_2 \times W_2 \qquad \text{(Equation 1)}$$

Meanwhile, a variable control method for determining the short-term driving tendency according to various embodiments of the present invention, which is based on the configuration of the short-term driving tendency determining unit 220, will be described with reference to FIG. 4.

Figure 4:
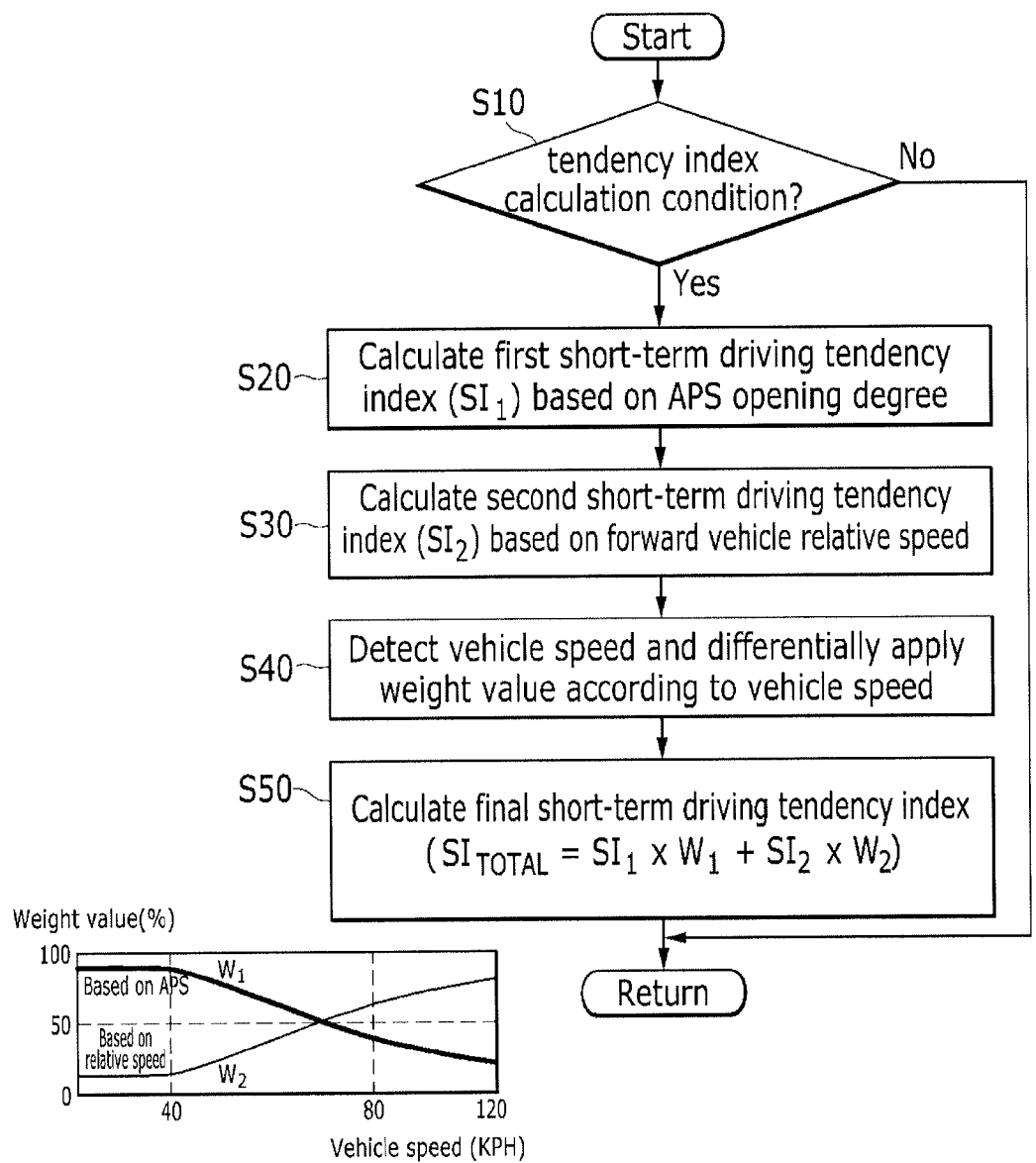
FIG. 4 is a flowchart illustrating an exemplary variable control method for determining a short-term driving tendency of a driver according to the present invention.

FIG. 4 is a flowchart illustrating a variable control method for determining the short-term driving tendency of the driver according to various embodiments of the present invention. Referring to the accompanying FIG. 4, the short-term driving tendency determining unit 220 initiates calculation of the short-term tendency when an accumulated running time or running distance reaches a predetermined condition for initiating the calculation of the short-term driving tendency index after the vehicle of the driver is started (S10; Yes). In this case, the short-term driving tendency determining unit 220 sets a condition for initiating calculation of the short-term driving tendency for a current running time (or distance) or for a predetermined time (or distance) while the vehicle currently runs, and may initiate the calculation of the short-term driving tendency of the driver in real time when the corresponding condition is satisfied.

The short-term driving tendency determining unit 220 calculates the first short-term driving tendency index $SI_1$ by calculating the fuzzy result value from the membership function based on the APS opening degree (S20). The short-term driving tendency determining unit 220 calculates the second short-term driving tendency index $SI_2$ by calculating the fuzzy result value from the membership function based on the forward vehicle relative speed (S30).

The short-term driving tendency determining unit 220 detects the current vehicle speed, and obtains and differentially applies the weight values of the first short-term driving tendency index $SI_1$ and the second short-term driving tendency index $SI_2$ according to the vehicle speed (S40). The short-term driving tendency determining unit 220 calculates the final short-term driving tendency index $SI_{TOTAL}$ on the basis of the first weight value $W_1$ of the first short-term driving tendency index $SI_1$ and the second weight value $W_2$ of the second short-term driving tendency index $SI_2$ (S50).

As such, according to various embodiments of the present invention, by obtaining the short-term driving tendency index based on the APS and the short-term driving tendency index based on the forward vehicle relative speed, respectively, and variably controlling the calculation of the short-term driving tendency while variably applying proportions in accordance with the vehicle speed, errors occurring at a situation of a low-speed congested road and a high-speed driving road may be reduced, and a more accurate short-term driving tendency of the driver may be obtained.

In addition, since the vehicle driving tendency of the driver is recognized based on the driving information of the driver, and the customized running mode, which coincides with the driving tendency of the individual driver, is provided, it is possible to expect effects of enhance emotional values of the customer and improving a corporate image.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable control apparatus for determining a short-term driving tendency of a driver according to driving a vehicle, comprising:
    a driving information collecting unit configured to collect driving information for determining a driving tendency;
    a first short-term driving tendency calculating module configured to calculate a first short-term driving tendency index using a fuzzy control theory based on an inputted opening degree of an accelerator pedal position sensor (APS);
    a second short-term driving tendency calculating module configured to calculate a second short-term driving tendency index using a fuzzy control theory based on an inputted forward vehicle relative speed; and
    a control module configured to calculate a final short-term driving tendency index by differentially applying weight values that correspond to each of the first short-term driving tendency index and the second short-term driving tendency index for each vehicle speed.

2. The variable control apparatus of claim 1, wherein the control module stores a sporty index weight value function for obtaining each of the weight values of the first short-term driving tendency index and the second short-term driving tendency index for each vehicle speed.

3. The variable control apparatus of claim 1, wherein the control module increases a proportion of the weight value of the first short-term driving tendency index compared to the second short-term driving tendency index when the vehicle speed is equal to or less than a first reference speed.

4. The variable control apparatus of claim 1, wherein the control module increases a proportion of the weight value of the second short-term driving tendency index compared to the first short-term driving tendency index when the vehicle speed is equal to or greater than a second reference speed.

5. The variable control apparatus of claim 1, wherein the final short-term driving tendency index is calculated by an equation of $$SI_{TOTAL} = SI_1 \times W_1 + SI_2 \times W_2,$$

wherein $SI_1$ denotes the first short-term driving tendency index, $W_1$ denotes a first weight value, $SI_2$ denotes the second short-term driving tendency index, and $W_2$ denotes a second weight value.

6. The variable control apparatus of claim 1, wherein the driving information collecting unit collects at least one of a vehicle speed according to driving the vehicle by the driver, vehicle acceleration, an inter-vehicle distance, the APS opening degree, a position of a brake pedal, a position of gear shifting, a steering state of the vehicle, position information based on a GPS/GIS, road information, a degree of congestion of a driving section, and weather information.

7. The variable control apparatus of claim 6, wherein the driving information collecting unit calculates a difference in speed between a forward vehicle and the vehicle of the driver using a distance from the forward vehicle, which is detected by an inter-vehicle distance sensor.

8. The variable control apparatus of claim 1, wherein the first short-term driving tendency calculating module sets a membership function on the basis of the APS opening degree, and calculates the first short-term driving tendency index from the inputted membership function of the APS opening degree.

9. The variable control apparatus of claim 1, wherein the second short-term driving tendency calculating module sets a membership function on the basis of the forward vehicle relative speed, and calculates the second short-term driving tendency index from the inputted membership function of the forward vehicle relative speed.

10. A variable control method for determining a short-term driving tendency of a driver according to driving a vehicle, comprising:
    collecting driving information for determining a short-term driving tendency according to driving the vehicle;
    calculating a first short-term driving tendency index by calculating a first fuzzy result value from a first membership function based on an accelerator pedal position sensor (APS) opening degree;
    calculating a second short-term driving tendency index by calculating a second fuzzy result value from a second membership function based on a forward vehicle relative speed; and
    calculating a final short-term driving tendency index by differentially applying weight values that correspond to each of the first short-term driving tendency index and the second short-term driving tendency index according to a vehicle speed.

11. The variable control method of claim 10, wherein the calculating of the final short-term driving tendency index includes increasing a proportion of the weight value of the first short-term driving tendency index compared to the second short-term driving tendency index when the vehicle speed is equal to or less than a first reference speed.

12. The variable control method of claim 10, wherein the calculating of the final short-term driving tendency index includes increasing a proportion of the weight value of the second short-term driving tendency index compared to the first short-term driving tendency index when the vehicle speed is equal to or greater than a second reference speed.

13. The variable control method of claim 10, wherein the collecting of the driving information includes initiating calculation of the short-term driving tendency when an accumulated running time or running distance reaches a predetermined condition for initiating the calculation of the short-term driving tendency index after the vehicle is started.

* * * * *